US007730007B2

(12) United States Patent
Salahshour et al.

(10) Patent No.: US 7,730,007 B2
(45) Date of Patent: Jun. 1, 2010

(54) IT EVENT DATA CLASSIFIER CONFIGURED TO LABEL MESSAGES IF MESSAGE IDENTIFIERS MAP DIRECTLY TO CLASSIFICATION CATEGORIES OR PARSE FOR FEATURE EXTRACTION IF MESSAGE IDENTIFIERS DO NOT MAP DIRECTLY TO CLASSIFICATION CATEGORIES

(75) Inventors: Abdolreza Salahshour, Raleigh, NC (US); Ma Sheng, Briarcliff Manor, NY (US); David Matthew Loewenstern, Maplewood, NJ (US); Kevin Gordon Minerley, Red Hook, NY (US)

(73) Assignee: International Business Machines Corporation, Armonk, NY (US)

( * ) Notice: Subject to any disclaimer, the term of this patent is extended or adjusted under 35 U.S.C. 154(b) by 71 days.

(21) Appl. No.: 12/205,722

(22) Filed: Sep. 5, 2008

(65) Prior Publication Data

US 2009/0006298 A1 Jan. 1, 2009

Related U.S. Application Data

(63) Continuation of application No. 11/117,151, filed on Apr. 27, 2005, now Pat. No. 7,461,044.

(51) Int. Cl.
G06F 17/21 (2006.01)
G06F 17/27 (2006.01)
G06F 7/76 (2006.01)
(52) U.S. Cl. .............................. 706/46; 706/20; 706/47
(58) Field of Classification Search .................... 706/46
See application file for complete search history.

(56) References Cited

U.S. PATENT DOCUMENTS

| 6,278,992 | B1 * | 8/2001 | Curtis et al. | .................... 707/3 |
| 6,507,829 | B1 | 1/2003 | Richards et al. | |
| 6,556,987 | B1 | 4/2003 | Brown et al. | |
| 6,701,314 | B1 | 3/2004 | Conover et al. | |
| 6,834,287 | B1 | 12/2004 | Folk-Williams et al. | |
| 2001/0037324 | A1 | 11/2001 | Agrawal et al. | |
| 2001/0044791 | A1 | 11/2001 | Richter et al. | |
| 2002/0004791 | A1 * | 1/2002 | Bax | ........................... 706/20 |

(Continued)

OTHER PUBLICATIONS

Ayuso et al., Adaptive Natural Language Processing, 1991.*

*Primary Examiner*—David R Vincent
*Assistant Examiner*—Nathan H Brown, Jr.
(74) *Attorney, Agent, or Firm*—Stevens & Showalter LLP

(57) ABSTRACT

An off-line knowledge acquisition process takes IT resource messages and automatically generates a set of rules used to provide situation categories for the resource messages/events. The off-line knowledge acquisition process generates an event-to-situation mapping file for efficiently mapping situation to events in runtime. Rules are fed back into a knowledge repository and process for reuse. The off-line knowledge acquisition process provides methods to reiterate the process of mining (autonomically and/or by human interaction) to improve the rules and confidence level assigning the situation categories. A runtime categorizer component uses the event-to-situation mapping file to add situation categories to the IT resource events. The runtime categorizer uses a plurality of annotator components each capable of adding a situation annotation to incoming messages based on rules generated by the off-line knowledge acquisition process. An assessment component chooses the best situation category from those annotated by the annotator components.

11 Claims, 5 Drawing Sheets

U.S. PATENT DOCUMENTS

| | | |
|---|---|---|
| 2002/0161763 A1 | 10/2002 | Ye et al. |
| 2003/0115189 A1* | 6/2003 | Srinivasa et al. ............... 707/3 |
| 2003/0225763 A1 | 12/2003 | Guilak et al. |
| 2004/0010541 A1 | 1/2004 | Allen et al. |
| 2004/0064464 A1 | 4/2004 | Forman et al. |

* cited by examiner

IT EVENT DATA CLASSIFIER CONFIGURED TO LABEL MESSAGES IF MESSAGE IDENTIFIERS MAP DIRECTLY TO CLASSIFICATION CATEGORIES OR PARSE FOR FEATURE EXTRACTION IF MESSAGE IDENTIFIERS DO NOT MAP DIRECTLY TO CLASSIFICATION CATEGORIES

BACKGROUND OF THE INVENTION

The present invention relates to the analysis of structural events. More particularly, the present invention relates to generating rules for matching a situation classification with an event and efficiently implementing the rules in runtime for matching situation classifications with the events.

Within the past two decades the development of raw computing power coupled with the proliferation of computer devices has grown at exponential rates. This growth along with the advent of the Internet have led to a new age of accessibility—to other people, other systems, and to information. This boom has also led to some complexity in the systems. The simultaneous explosion of information and integration of technology into everyday life has brought on new demands for how people manage and maintain computer systems.

Additionally, the complexity of these systems and the way they work together has and will create a shortage of skilled IT workers to manage all of the systems. The problem is expected to increase exponentially, just as the dependence on technology has. As access to information becomes omnipresent through PC's, hand-held and wireless devices, the stability of current infrastructure, systems, and data is at an increasingly greater risk to suffer outages and general disrepair One new model of computing, termed "autonomic computing," shifts the fundamental definition of the technology age from one of computing, to that defined by data. According to this new paradigm, access to data from multiple, distributed sources, in addition to traditional centralized storage devices will allow users to transparently access information when and where they need it. At the same time, this new view of computing will necessitate changing the industry's focus on processing speed and storage to one of developing distributed networks that are largely self-managing, self-diagnostic, and transparent to the user.

The aim of providing systems that are self-healing, self-configuring, self-protecting and self-optimizing requires the handling/correlating of heterogenous log data produced by different vendors and applications. The first step toward this direction is to define a unified format. The CBE (Common Base Event) has been defined and proposed as industry standard.

BRIEF SUMMARY OF THE INVENTION

According to one aspect, the present invention comprises a computer program product for classifying a message. The computer program product comprises a computer readable medium having computer readable program code embodied therein. The computer readable program code comprises computer readable program code configured to receive a message to be classified, the message having a message identifier. The computer readable program code also comprises computer readable program code configured to determine if the message identifier uniquely maps to a corresponding classification category. The computer readable program code further comprises computer readable program code configured to label the message with the identified classification category if the message identifier maps directly to a corresponding classification category. The computer readable program code additionally comprises computer readable program code configured to parse the message to be classified and identify a plurality of features from the parsed message if the message identifier does not map directly to a corresponding classification category. Further, the computer readable program code comprises computer readable program code configured to compare at least one classification rule to the plurality of features if the message identifier does not map directly to a corresponding classification category. Additionally, the computer readable program code comprises computer readable program code configured to rate each classification rule that matches to the plurality of features. Also, the computer readable program code comprises computer readable program code configured to identify a classification category from the rating. The computer readable program code further comprises computer readable program code configured to label the message with the identified classification category.

According to another aspect, the present invention comprises a system for classifying a message. The system comprises a module configured to receive a message to be classified, the message having a message identifier. The system also comprises a module configured to determine if the message identifier uniquely maps to a corresponding classification category. The system further comprises a module configured to label the message with the identified classification category if the message identifier maps directly to a corresponding classification category. The system additionally comprises a module configured to parse the message to be classified and identify a plurality of features from the parsed message if the message identifier does not map directly to a corresponding classification category. Further, the system comprises a module configured to compare at least one classification rule to the plurality of features if the message identifier does not map directly to a corresponding classification category. Additionally, the system comprises a module configured to rate each classification rule that matches to the plurality of features. Also, the system comprises a module configured to identify a classification category from the rating. The system further comprises a module configured to label the message with the identified classification category.

According to yet another aspect, the present invention comprises a computer-implemented method of classifying a message. The method comprises receiving a message to be classified on a server, the message having a message identifier. The method also comprises determining if the message identifier uniquely maps to a corresponding classification category. The method further comprises labeling the message with the identified classification category if the message identifier maps directly to a corresponding classification category. The method additionally comprises parsing the message to be classified and identifying a plurality of features from the parsed message if the message identifier does not map directly to a corresponding classification category. Further, the method comprises comparing at least one classification rule to the plurality of features if the message identifier does not map directly to a corresponding classification category. Additionally, the method comprises rating each classification rule that matches to the plurality of features. Also, the method comprises identifying a classification category from the rating. The method further comprises labeling the message with the identified classification category.

Figure 1:
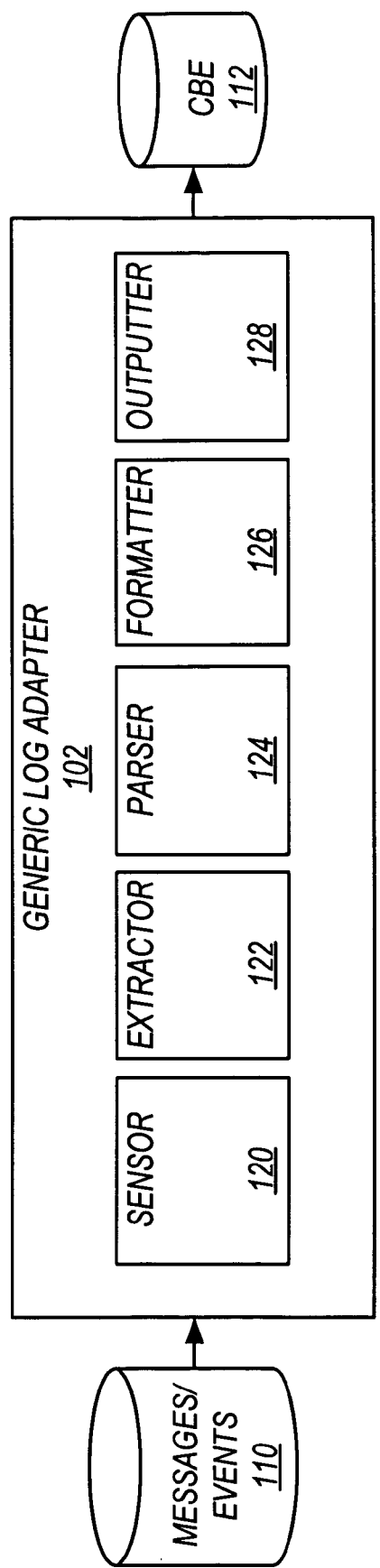
FIG. 1 is a diagram depicting the logical elements of the GLA.

Other features of the present invention will be apparent from the accompanying drawings and from the following detailed description.

DETAILED DESCRIPTION OF THE INVENTION

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit" or "module." Furthermore, the present invention may take the form of a computer program product on a computer-usable storage medium having computer-usable program code embodied in the medium.

Any suitable computer readable medium may be utilized. The computer-usable or computer-readable medium may be, for example, but not limited to, an electronic, magnetic, optical, magneo-optical, or semiconductor system, apparatus, or device. More specific examples (a nonexhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. Note that the computer-usable or computer-readable medium could even be another suitable medium upon which the program can be electronically captured, via, for instance, optical scanning, then compiled, interpreted, or otherwise processed in a suitable manner, if necessary, and then stored in a computer memory. In the context of this document, a computer-usable or computer-readable medium may be any non-signal or non-paper medium that can contain, store, communicate, or transport the program for use by or in connection with the instruction execution system, apparatus, or device.

Computer program code for carrying out operations of the present invention may be written in an object oriented programming language such as Java7, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The Generic Log Adapter (GLA) is a rule-based tool that transforms software log events into the CBE event format of the autonomic computing architecture. FIG. 1 is a diagram depicting the logical elements of the GLA tool and presented directly below is a brief description of its runtime operation. Sensor portion 120 defines the mechanism that reads the log content from messages/events 110. Extractor 122 receives the message lines from sensor 120 and separates the event messages. Essentially, extractor 122 defines the rules to recognize the message boundaries. Parser 124 defines a set of string mappings to convert the message received from extractor 122 to Common Base Event entries. Parser 124 processes the message in two phases: a global processing phase which is a set of global regular expressions are executed against the message provided by extractor 122; and an attribute processing phase implements a specific set of substitution rules that are executed to determine the attribute values. Furthermore, Parser 124 may "tokenize" the message into a series of name-value-pairs during the global processing phase, and then refer to these tokens by name during the attribute processing phase. Formatter 126 receives the attributes and their values from parser 124 and then creates the CBE object instance. Finally, outputter 128 wraps the formatted object from the formatter in a form suitable for storing. For example, a CBE event object may be converted to a XML format that can be stored in a file.

Another aspect in handling/correlating of heterogenous log data is a standardized common semantics. A common semantics, in this context, defines the taxonomy for describing common situations (also known as situation types) of log messages and their qualifiers, which taken together are termed "situation categories," also known as "situation semantic." For example, it is necessary to know that an application server, such as IBM® WebSphere® Application Server (WAS), has been "STARTED" so that an application can be deployed on that application server (IBM and WebSphere are trademarks of International Business Machines Corporation in the United States, other countries, or both). To build autonomic tools to perform such automated deployments across multiple types of systems, it is necessary to encode semantics such as "STARTED" in an IT resource- and system-independent manner, by using, for example, the CBE standard.

A person familiar with a log may use the GLA to develop rules for parsing the log into CBEs and then for adding situation categories. The GLA tool does not classify messages into standard situations because assigning a situation category (or any category for that matter) requires understanding the details of individual messages and the details vary from message to message. In GLA, therefore, classifying a message into a situation category requires writing parsing rules specific to each message.

Figure 2:
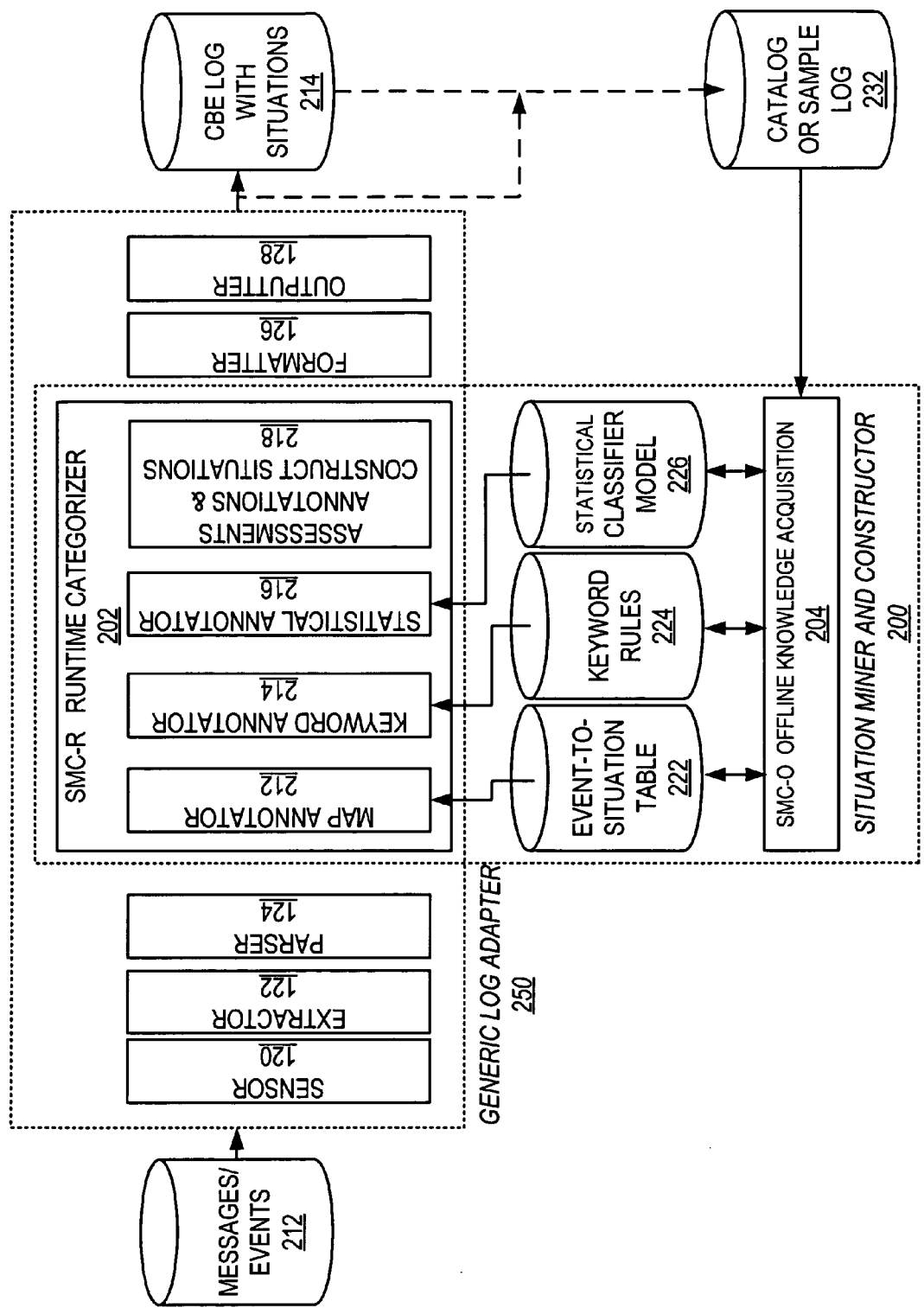
FIG. 2 is a diagram depicting the logical elements of the SMC tool in accordance with an exemplary embodiment of the present invention.

The present invention provides a mechanism and methods for mining and constructing situation categories for IT resource messages or events, referred to herein after as the Situation Miner and Constructor (SMC). FIG. 2 is a diagram depicting the logical elements of the SMC tool in accordance with an exemplary embodiment of the present invention. SMC 200 comprises two inter-connected components: an off-line knowledge acquisition process (SMC-O 204) and a runtime situation classifier, also known as categorizer (SMC-R 202). In accordance with one exemplary embodiment of the present invention, the runtime categorizer SMC-R 202 is incorporated in the GLA runtime, between parser 124 and formatter 126. So situated, SMC-R 202 takes advantage of the initial processes of GLA 250 for reading, separating and parsing the log content from messages/events 110, and posterior processes of GLA 250 for creating the CBE object. Of course, the structure of GLA 250 can be greatly simplified if the IT resource message is in CBE format. It should also be understood that although various exemplary embodiments of the present invention are discussed with regard to CBE formatted messages/events, the present invention may be practiced using messages/events in other standardized formats. Other formats may include CIM (Common Information Model of DMTF), and OASIS Web Services Event Format of Web Services Distributed Manager. Additionally, the present invention does not rely on any particular standardized message/event format and therefore may be used with any simple text formatted message.

One function of SMC-O 204 is to take IT resource messages (in either the CBE format generated natively or using GLA, depicted in the figure with the GLA) and use a variety of mining techniques and technologies to automatically generate a set of rules used to provide situation categories (i.e., common situation semantics) for the IT resource messages/events. These include keyword classifier rules 224, and other types, the functions of which will be discussed in greater detail below. Also provided by SMC-O 204, is statistical classifier model 226, (e.g., decision tree classifier, naive Bayes classifier, etc.) for further classifying message text. A second function of SMC-O 204 is to generate event-to-situation mapping file 222 (or table), that is used by SMC-R 202 for augmenting the IT resource messages with the appropriate situation categories at runtime. IT resource messages that are useful for developing new rules may legacy messages in sample log or catalog 232, or contemporary. Catalog 232 may be used for instantiating the SMC-O off-line knowledge acquisition process at start up for defining preliminary rules and, possibly, formulating a base event-to-situation mapping file (unless, of course, suitable rules and an event-to-situation mapping file are provided). These preliminary rules are temporary and will be immediately updated by SMC-O 204 once message are received in runtime categorizer SMC-R 202. IT messages that either cannot be matched to a situation at runtime, or have been erroneously classified, are used by SMC-O 204 for revising the preliminary (current) classification rules and/or event-to-situation map. Furthermore, the rules are fed back into a knowledge repository, for reuse by the SMO-O knowledge acquisition process. Finally, SMC-O 204 also provides methods to reiterate the process of mining (autonomically and/or by human interaction) to improve the rules and confidence level assigning the situation categories.

SMC-R 202 is a real-time component that classifies messages using multiple classifiers in sequence, with faster methods first, and then combines results from the classifiers. A mechanism is provided to skip slower methods when a high-confidence label is generated by a faster method. At a high level, SMC-R 202 provides situation categories to IT messages/events using a two-tiered classification process. After the message is identified, map annotator 212 of SMC-R 202 checks event-to-situation mapping file 222 for the message identifier, when available from SMC-O 204. If the message is matched, the situation category is appended to the IT resource event. If the message is not listed in event-to-situation mapping file 222, SMC-R 202 invokes one or more computationally intensive classification processes. In the second tier, classification rules are applied to the IT resource message for obtaining unique weighted situation categories (weighting based on confidence level) from each classifier. The message is annotated with weighting (confidence) information and with a corresponding situation category from classifiers that found a situation match. Structurally, SMC-R 202 provides a set of optional plugable annotator components, for example keyword annotator 214 and statistical annotator 216, each capable of adding a situation annotation to the message. These may be implemented as blade annotators that may be interchanged. The optional annotators are used to handle any new or those messages/events that could not find a match in the event-to-situation map file. These annotators may add situation category, confidence level, etc. to the incoming IT resource messages/events. Also, SMC-R 202 comprises assessment component 218 for choosing the best situation category voted by the annotator components, using a variety of techniques, described later, and the result is added to the event (e.g., the CBE formatted event).

The SMC-O off-line knowledge acquisition process addresses how to construct or review the knowledge required by the runtime component. The process includes data pre-processing/formatting, an initial classifier based on some initial seed and/or current knowledge, a reviewing process that allows a user (expert) to modify the classification results and rules, with data mining and machine learning algorithms that can learn from examples and build knowledge and rules needed for classifiers. The off-line process provides a systematic review with a subject matter expert and methodology.

The SMC-O organizes the review process into an open-ended series of sessions. In each session, the SMC-O processes a data file of events, uses rules to assign preliminary situation categories to the events, interacts with an expert to confirm or correct some subset of the situation category assignments, saves a data file of events including situation categories, and derives new rules from the new data file. The initial input messages are drawn from a message catalog or sample of log files.

The central insight driving the interactive learning process is that the task of labeling a data set is made easier if the data set is grouped into clusters of semantically similar data. Each entry in such a cluster may receive the same label or, if not, there will often be some readily identifiable feature of the entry that makes clear why it is an exceptional case.

This task of semantic clustering is not equivalent to categorization because there may be many disparate clusters that make up a single category and because clusters may have ill-defined boundaries that do not correspond precisely to the predefined categories. The categories ("situations") may be used for labeling the messages, but the semantic clusters are merely a means to that end.

Figure 3:
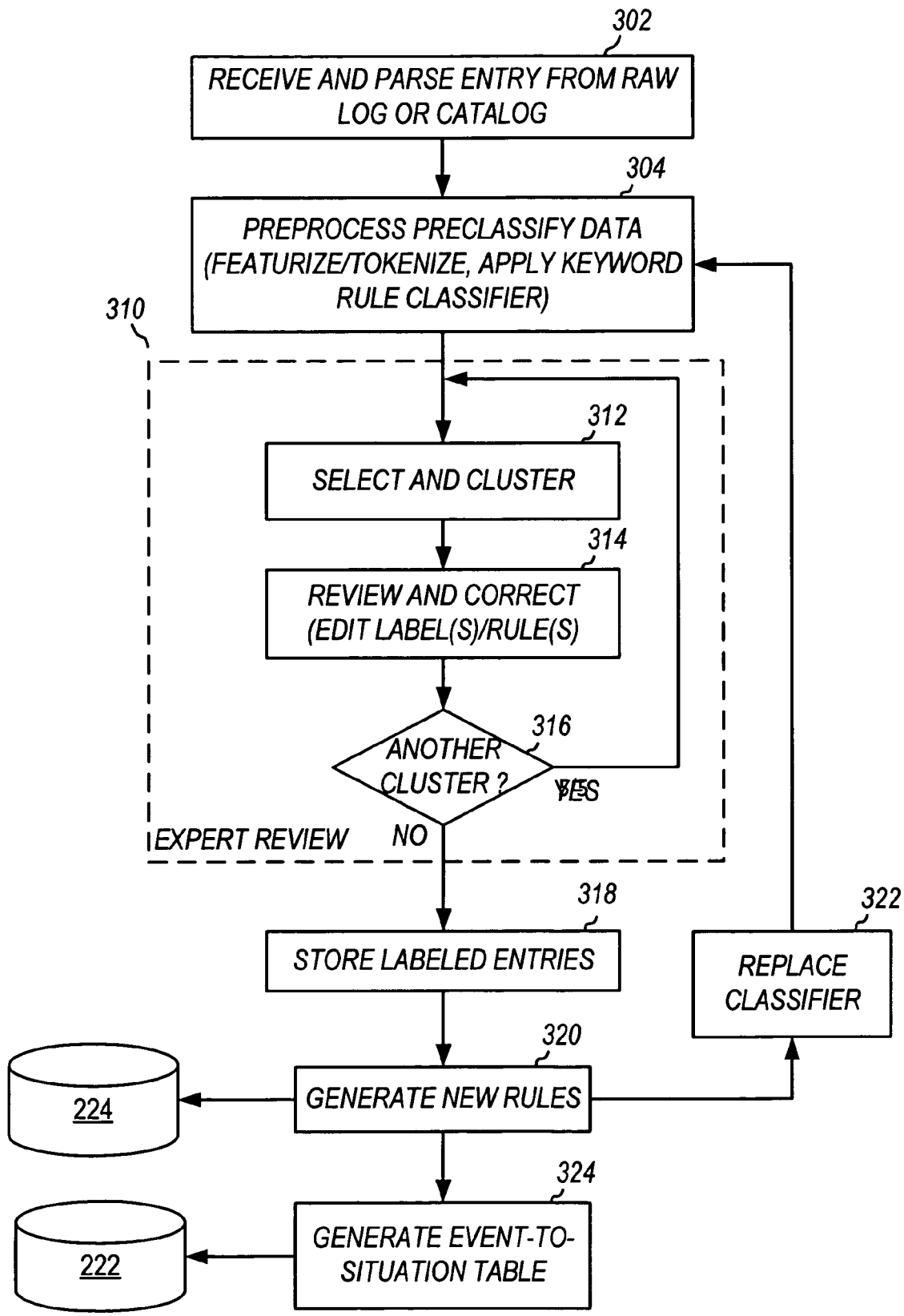
FIG. 3 is a flowchart depicting the off-line knowledge acquisition process and more specifically, the interactive learning process contained therein, in accordance with an exemplary embodiment of the present invention.

FIG. 3 is a flowchart depicting the off-line knowledge acquisition process and more specifically, the interactive learning process contained therein, in accordance with an exemplary embodiment of the present invention. As an overview, the process takes the form of two nested iterative loops. First, the data are converted into standardized format for the SMC-O and stored. This data then enters the outer iterative loop, where a subset is selected by an expert and labeled, or is reviewed in an inner iterative loop and the labels are added to the stored copy of the parsed data, along with information identifying the expert. The outer loop iterates until all experts have completed their tasks; typically, this means that the entire data set has been labeled or has been reviewed by at least one expert. Finally, in the case that a catalog was the source of the data, an event to situation table is generated of (catalog entry identifier, situation) pairs. By the end of the process, the stored parsed data is now labeled and reviewed, and may be used as a training set for supervised learning. As a by-product of the iterative process, a keyword rule classifier is also generated from the labeled data set.

Returning to FIG. 3, the process begins by receiving data received from a raw log or catalog (either a catalog or sample log files) and preprocessed into a standard format using, for example, the GLA, and is then stored (step 302). The outer loop starts with the parsed, but unfeaturized data and is initially also unlabeled. However, the data may receive a label in any subsequent iteration, or in some cases, may have already received a label during a previous iteration, permitting an expert to review or correct the decisions of previous experts. The data is preprocessed and preclassified by a keyword rule classifier (step 304). At startup, initially, this classifier may be generated on another data set or a simple classifier containing only a few hand-generated rules, therefore accuracy will suffer. During preprocessing, the SMC-O attempts to reduce the volume of message features to be considered, thereby simplifying rule generating and improving clustering. Additionally, the SMC-O, using the limited rules at its disposal, preclassifies at least some of the messages. This step will be discussed in greater detail below with regard to the flowchart depicted in FIG. 4.

The data then enters an inner iterative loop under the control of the expert. The portion of the process relegated to the expert is delineated by rectangle 310. Here, the aim is to identify a set or cluster of semantically similar data for generating new rules, as well as verifying old rules. The expert selects a subset of the data and uses a combination of keyword rules, features, and classifications to find a cluster of data which the expert judges to have similar semantics (step 312). Alternatively, the expert may use keyword rules to find a cluster of data which the classifier judges to have similar semantics, or the expert may combine the two approaches. In any case, the expert reviews the cluster and corrects any potential misclassifications (step 314). If the session begins with rules that were derived from entries in another data set, or from a few simple manually created rules, it may require several iterations of the inner loop for thoroughly identifying all clusters of semantically similar data. In any case, the inner loop iterates until the expert determines that the session is over (step 316). Typically the session ends when all clusters of semantically similar data have been identified.

In accordance with one exemplary embodiment of the present invention, rules generated from the entries in a set may have the form of {pattern→situation category}. A "pattern" is composed of two sets of features, called the "selected" (inclusion) and "negated" (exclusion) features. A rule matches an event if all of its selected features appear in the feature set of the entry and none of its negated features do. A rule is measured in terms of coverage and confidence on the data set from which it was derived. The data set is typically the set of reviewed entries from the previous session. The rule's coverage is the number of entries in the data set that it matches. The rule's confidence is the fraction of the categorized entries that it matches in the data set for which the rule's and the entry's situation category are identical. When the SMC-R uses rules to assign a situation category to an entry, it does so by finding the rule with the highest confidence that matches the entry and then assigning (labeling) the rule's situation category to the entry.

Generating rules can take various algorithmic forms. One exemplary method in accordance with exemplary embodiments of the present invention for generating keyword rules is a classification by association algorithm (for example Apriori) modified by a filter on the size of candidate. An exemplary modified rule generation algorithm is presented directly below.

```
function Apriori
Input: labeled data set D.
Output: rule set R.
L₁ = {large 1-itemsets of D};
for (k = 2; L_{k-1} ≠ ∅ ; k++) do begin
    C_k = band-restrict(apriori-gen(L_{k-1}));
    forall messages t χ D do begin
        C_t = subset(C_k, t);
        forall candidates c χ C_t do
            c.count ++;
    end
    L_k = { c χ C_k | c.count μ minsup};
end
R = { c χ 4_k L_k | c.conf μ minconf };
```

Below is an exemplary heuristic filter used with the modified rule generation algorithm shown above.

```
function band-restrict
Input: candidate set C
Output: candidate set C'
if (|C| μ C_{max}) then begin
    sort C using S;
    C' = the first C_{max} elements of C;
end else begin
    C' = C;
end
```

It is well-known that some algorithms are memory intensive so the minimum support should be chosen carefully. One solution to the memory problem is a heuristic filter that removes "bad" candidate rules. The exemplary heuristic filter is as follows: $C_{max}$ is a configurable value depending upon the memory limitations of the computer. Whenever Apriori generates a candidate set with more than $C_{max}$ elements, the candidates are sorted according in descending order of sorting function S (below) and all but the first $C_{max}$ candidates are discarded. The effect of function S is to prefer large itemsets of positive features but not large itemsets of negative features, and to prefer high confidence rules.

```
function S
Input: candidate c, candidate c'
Output: true if c should be placed before c',
       false otherwise
    if (c.conf > c'.conf) then
        return true;
    else if (c'.conf > c.conf) then
        return false;
    else begin
        neg  = | { f χ c.pattern  | f is a negated feature } |;
        neg' = | { f χ c'.pattern | f is a negated feature } |;
        pos  = | { f χ c.pattern  } | - neg;
        pos' = | { f χ c'.pattern } | - neg';
        if (pos - neg > pos' - neg') then
            return true;
        else if (pos - neg < pos' - neg') then
            return false;
        else if (c.support > c'.support) then
            return true;
        else
            return false;
    end
```

Once the data entries have been reviewed and labeled, or relabeled, and stored (step 318), it is then used to create a new keyword list classifier using an association rule generation algorithm, discussed further below (step 320). The new classifier replaces the earlier classifier in the outer loop at step 304 (step 322). The outer loop iterates with a new session, steps 304-320, with the same or a different expert. The process completes when all experts have completed their tasks, typically by generating a completely labeled set of data. Existing messages can also be analyzed using the SMC-O off-line knowledge acquisition process to generate an event-to-situation semantic (such as common categories) map (step 324).

Manual rule editing requires a greater understanding of the function of rules, however it permits improved ease of data selection and improved preclassification to the sophisticated expert. In addition, rule editing improves the value of cross-training. Cross-training is understood as the use of rules or a classifier trained using a set of catalogs or sample logs on a log that was not generated from the catalogs or from the same source as the sample logs. The most common use of cross-training is the construction of the initial classifier used in the very first iteration of the outer loop. Cross-training is also desirable in the case that there is a mismatch between a log and the best available catalog, e.g., because only an out-of-date version of the catalog is available.

Figure 4:
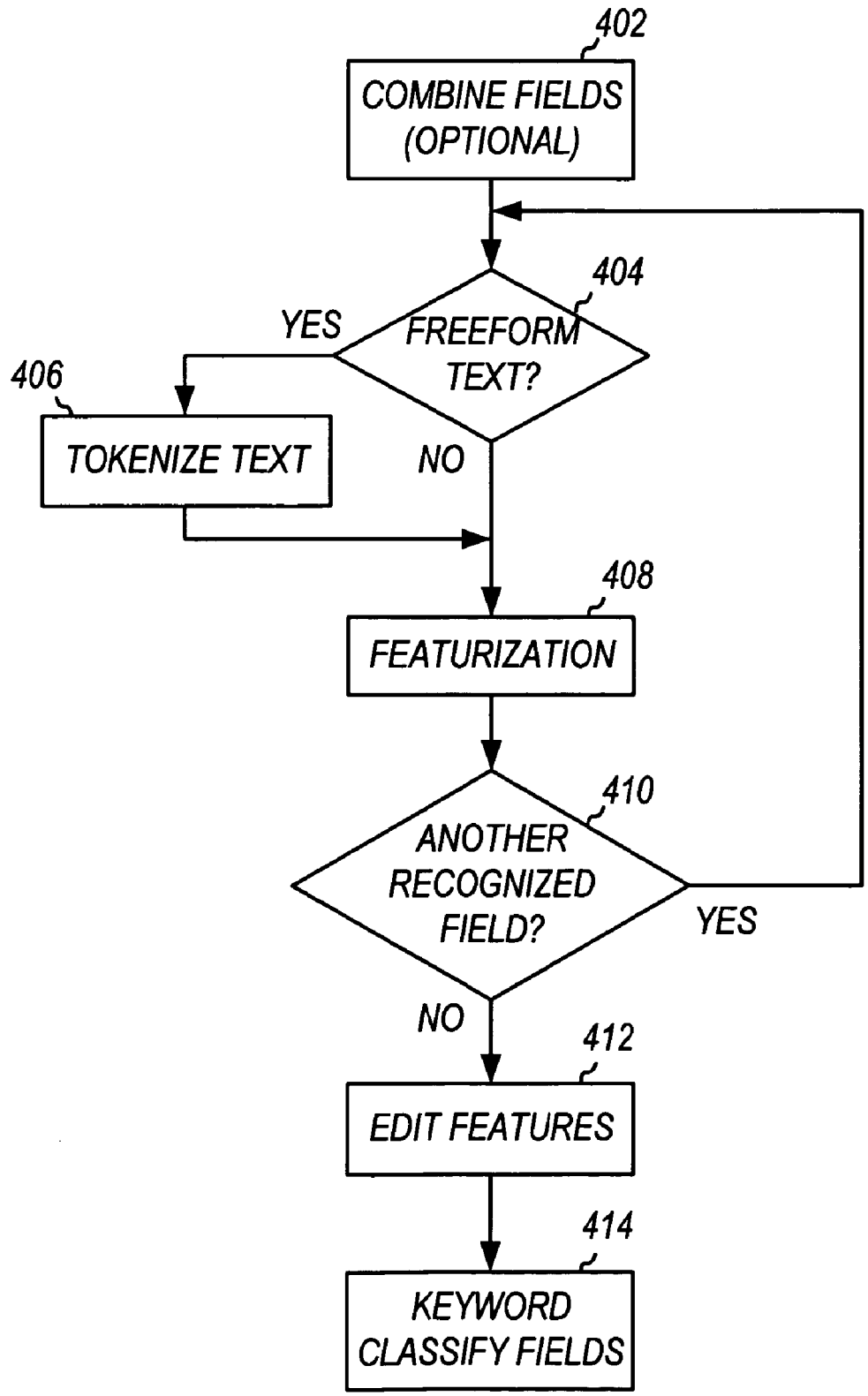
FIG. 4 is a flowchart depicting the preprocess methodology employed by the off-line knowledge acquisition process in accordance with an exemplary embodiment of the present invention.

Referring now to preprocessing step 304, FIG. 4 is a flowchart depicting the method preprocessing event field data employed by the off-line knowledge acquisition process in accordance with an exemplary embodiment of the present invention. This process can be divided into discrete steps of featurization, feature editing (optional) and classification. When the SMC-O processes an event, it breaks it down into the features used to build and match rules. Event entries are composed of one or more fields that are event properties or attributes such as the CBE msg or severity properties (or event fields). In the log domain, it is normal for a catalog entry or log event to contain multiple fields that have differing semantics and may even require different processing. For example, a catalog entry may have an identifier, a natural language message, a detailed explanation, a description of appropriate help, and a severity code. Some of these should be processed as natural free-form text, while others should be treated as individual features. It may be useful to combine fields before featurization or to keep features from different fields separate, e.g., treating "error" differently depending upon whether it is a word in the message field or a severity code). Thus, featurization step starts by selecting the appropriate fields and possibly combining some (as determined by a configuration file) (step 402). Fields that considered natural language are identified (step 404) and those fields that are tokenized (step 406) and the tokens are made into features by attaching a field identifier to each one. Fields that are not considered natural language (such as severity codes) are formed into a single feature by attaching a field identifier to the content of the field (step 408). Features are tagged with the property name so that features from different properties are handled separately. Features are represented as field word; for simplicity features from the default field may be displayed as word. The process iterates through the fields of an entry, processing the fields are recognized by the SMC-O and ignoring all others. The SMC-O's configuration will determine which fields are recognized by the SMC-O. During the iterations, each entry stores its features in two representations. In the first, each feature is paired with its original token, and the pairs are kept for each field in the order of the tokens in the field. This representation is not used for classification, but instead supports interaction with an expert by maintaining a close connection between features and the original text. The second representation is an unordered set of features.

Returning to FIG. 4, the features are then edited in an attempt to limit the number of features, thereby lessening the number for rules must be defined (step 410). Fewer features translates to more simplified rule building and matching. Changing a feature will affect which rules match the entry. It is common in most applications involving natural language to perform some feature editing. At a minimum, it is helpful to discard features corresponding to common stopwords words such as "a," "the," "and," etc. Another editing technique is to expand contractions into their root words so that simple correlations such as the equivalence of "isn't" and "is not" do not need to be learned by an algorithm. Stemming combines features representing different versions of the same word, such as "had" and "has." In addition, in the log domain, it is common for the same concept to be expressed using different words in different messages: e.g., a message may use such words as "start," "begin," "initialize," or even "enter" to indicate that an application has started.

For new messages/events, the runtime categorizer component requires far smaller number of rules than the current state-of-the-art (i.e., GLA), with a corresponding improvement in throughput and memory utilization.

Table I below depicts the stages of an exemplary message field during featurization and editing and Table II shows examples of feature editing rules with explanations.

TABLE I

| Step | Example |
| --- | --- |
| Initial message (msg field) | WSVR0215W: Starting application, Appl, failed. The application is not installed. |
| Featurization | msg: appl msg: application msg: failed msg: installed msg: is msg: not msg: starting msg: the msg: WSVR0215W |
| Regular Expression Editing | msg: application msg: failed msg: installed msg: is msg: not msg: starting |
| WordNet stemming | msg: application msg: fail msg: install msg: be msg: not msg: start |
| WordNet | msg: application msg: be |

TABLE I-continued

| Step | Example |
|---|---|
| synonyms | msg: begin msg: fail<br>msg: initialize msg: install<br>msg: module msg: not sg: start |

TABLE II

| Pattern | Rewrite | Explanation |
|---|---|---|
| \d+ | | Numbers are stopwords |
| "(.*)" | \1 | Remove quotation marks |
| can't | can't<br>cannot<br>can not | Expand the contraction "can't" |

In accordance with one exemplary embodiment of the present invention, rules generated from the entries in a set may have the form of {pattern→situation category}. A 'pattern, is composed of two sets of features, called the "selected" (inclusion) and "negated" (exclusion) features. A rule matches an event if all of its selected features appear in the feature set of the entry and none of its negated features do. A rule is measured in terms of coverage and confidence on the data set from which it was derived. The data set is typically the set of reviewed entries from the previous session. The rule's coverage is the number of entries in the data set that it matches. The rule's confidence is the fraction of the categorized entries that it matches in the data set for which the rule's and the entry's situation category are identical. When the SMC-R uses rules to assign a situation category to an entry, it does so by finding the rule with the highest confidence that matches the entry and then assigning the rule's situation category to the entry.

A mechanism for improving the accuracy and confidence level of categorizing situations or events is by providing context as an attribute, thereby permitting the learning of rules that are context-specific. That is, an attribute designated to carry context semantics, for example, but not inclusive, one or a combination of words such as "Relational Database," "Network," "Application Server," and "Storage Device" can assist to further refine and improve categorization implied by mining rules mentioned in this disclosure. For example, " . . . xyz controller initiated . . . " may suggest a "Start" category in context of "application Server" yet it may suggest "Connect" in context of "Network" or "Availability" in context of "Storage Device."

Efficiency, at runtime, may be characterized by processing throughput (e.g. 100 messages per second). Accuracy may be characterized by the confidence of results. Coverage may be characterized by how the number of messages for which the algorithm can assign categories. Many classification algorithms exist, but they provide different efficiency, accuracy and coverage trade-offs. For example, a lookup table algorithm is very fast with 100% accuracy, but may have poor coverage because it cannot assign a category to a new message. A keyword classifier has a much higher coverage, but it is not 100% accurate and is slower. In accordance with an embodiment of the present invention, the runtime categorizer SMC-R combines multiple classifiers to best trade-off efficiency, accuracy and coverage. In particular, a look-up table as the first stage categorizer; only if it fails, does a keyword classifier, and others, take over.

Figure 5:
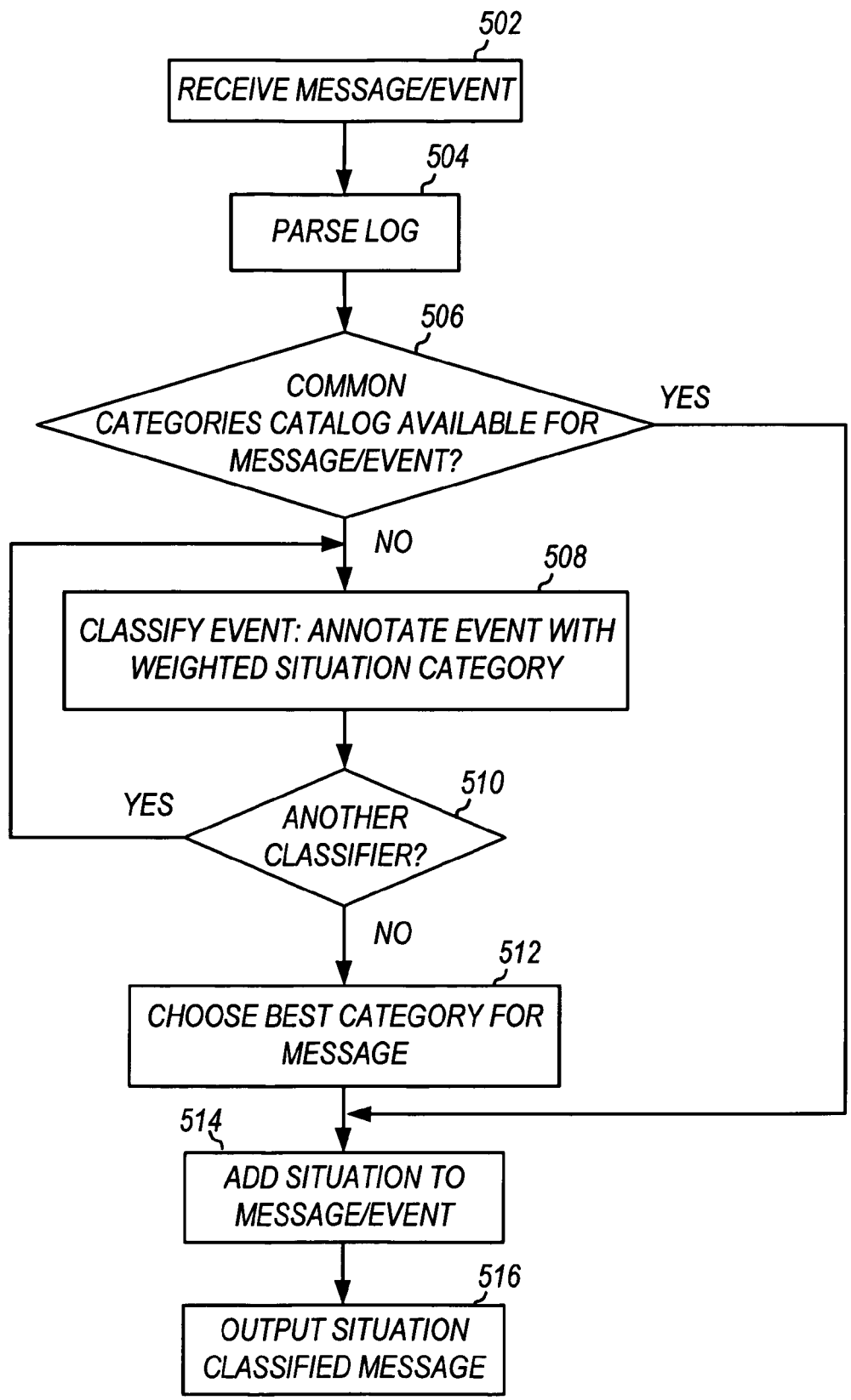
FIG. 5 is a flowchart depicting a runtime process for situation labeling IT messages of the SMC-R in accordance with an exemplary embodiment of the present invention.

FIG. 5 is a flowchart depicting a runtime process for situation labeling IT messages of the SMC-R runtime categorizer in accordance with an exemplary embodiment of the present invention. In accordance with one exemplary embodiment the SMC-R is incorporated in an adapter for transforming software log events into the standard situational event formats, such as a GLA. Alternatively, if the messages are received in a standard situational event format, the SMC-R may be implemented as a stand alone tool. In any case, the SMC-R processes incoming IT resource messages, sequentially, with a series of classifiers to find the best situation category match. The runtime process begins by receiving and parses the message (steps 502-503). Next, a map classifier attempts to match a message identifier directly to a situation using a native situation-to-even table (step 506). As discussed elsewhere above, the map classifier component utilizes an event-to-situation semantic (such as common categories) map generated by the SMC-O off-line knowledge acquisition process. If a match exists, the SMC-R assigns the situation directly to message, without the overhead of parsing rule execution.

However, if the map annotator fails, the message is sequentially processed by one or more remaining annotators, each capable of adding a situation annotation to the message (for example situation category, confidence level, etc.) (step 508). These runtime annotator components include classifiers such as a keyword classifier and statistical classifiers (e.g. decision tree classifier, naive Bayes classifier, etc). Each classifier processes the message in turn and attaches its result and the confidence level as an annotation. After all annotators have finished (step 510), the assessment component examines the annotations and chooses the best situation category, using a variety of assessment techniques, for example, one with the highest confidence level, one with the most vote (number of annotators that came up with the same confidence level), ones with the greatest number of samples, also, it deals with the ties situation (step 512). Finally, the result is added to the message (e.g. the CBE formatted event) (step 514) and output (step 516).

Below is an example of an EPP console log event.

::117::STATE:20040623:141906:Ctr:AgId(44):com.ibm.e-pp.sys.ctr.CrLogHandle(59219):Thread(Thread-3)

::117::STATE:EPP_ctr_msg_D_2060: ==>enable( ) Log agent enabled

Below is an example of the Common Base Event (CBE) result of parsing the EPP console log event depicted above (without situation), with the GLA, but without the SCR.

< CommonBaseEventCereationTime="22021-12-14T19:
19:06,000Z"
globalInstanceId="FE7E9332ECF5F4DDA7C678E4193A11D9"
msg="enable( ) Log agent enabled" severity="10" version="1.0.1 ">
<sourceComponentId component="End-to-end Probe Platform
(EPP)" componentIdType="Application"
instanceId="SILESIA.watson.ibm.com.00120040623141905"
location="SILESIA.watson.ibm,com"
locationType="Hostname" threadId="Thread-3"
componentType="EPP Controller"/>

-continued

```
<msgDataElement msgLocale="null">
    <msgId>117</msgId>
    <msgCatalogId>EPP_ctr_msg_D_2060</msgCatalogId>
    <msgCatalog>Ctr</msgCatalog>
</msgDataElement>
</CommonBaseEvent>
```

Below is an example of the CBE result of parsing the EPP console log without situation from the SCR.

```
<CommonBaseEvent creationTime=" 2021-12-14T19:19:06.000Z"
globalInstanceId="FE7E9332ECF5F4DDA7C678E4193A11D9" msg="enable( ) Log agent enabled"
severity="10"version="1.0.1">
    <sourceComponentId component="End-to-end ProbePlatform (EPP)" componentIdType="Application"
instanceId="SILESIA.watson.ibm.com.00120040623141905" location="SILESIA.watson.ibm.com"
        locationType="Hostname" threadId="Thread-3" componentType="EPP Controller"/>
        <msgDataElement msgLocale="null">
            <msgId>117</msgId>
            <msgCatalogIEPP.ctr_msg_D_2060</msgCatalogId>
            <msgCatalog>Ctr<msgCatalog>
        </msgDataEletment>
        <situation categoryName="StartSituation">
            <situationType
            xsi:type="StartSituation"
            reasoningScope="INTERNAL"
            successDisposition="SUCCESSFUL"
            SituationQualifier="START COMPLETED" />
        </situation>
</CommonBaseEvent>
```

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

What is claimed is:

1. A computer program product for classifying a message, the computer program product comprising:
    a computer readable medium having computer readable program code embodied therein, the computer readable program code comprising:
        computer readable program code configured to receive a message to be classified, said message having a message identifier;
        computer readable program code configured to determine if said message identifier uniquely maps to a corresponding classification category;
        computer readable program code configured to label the message with the identified classification category if said message identifier maps directly to a corresponding classification category;
        computer readable program code configured to parse the message to be classified and identify a plurality of features from the parsed message if said message identifier does not map directly to a corresponding classification category;
        computer readable program code configured to compare at least one classification rule to the plurality of features if said message identifier does not map directly to a corresponding classification category;
        computer readable program code configured to rate each classification rule that matches to said plurality of features;
        computer readable program code configured to identify a classification category from said rating; and
        computer readable program code configured to label the message with the identified classification category.

2. The computer program product of claim 1, further comprising:
computer readable program code configured to compare a second classification rule to the plurality of features.

3. The computer program product of claim 1, further comprising:
computer readable program code configured to receive a plurality of messages;
computer readable program code configured to parse the plurality of messages;
computer readable program code configured to identify features from the plurality of messages;
computer readable program code configured to select a common classification category semantic;
computer readable program code configured to match at least some of the identified features with the common classification category semantic; and
computer readable program code configured to generate a classification rule from the identified features matched with the common classification category semantic.

4. The computer program product of claim 1, further comprising:
computer readable program code configured to receive a plurality of messages;
computer readable program code configured to parse the plurality of messages;
computer readable program code configured to identify features from the plurality of messages;
computer readable program code configured to select a plurality of common classification category semantics;
computer readable program code configured to match at least some of the identified features with the respective plurality of common classification category semantics;
computer readable program code configured to identify messages corresponding to the at least some of the identified features; and
computer readable program code configured to generate a classification category to message map.

5. A system for classifying a message, the system comprising:
a module configured to receive a message to be classified, said message having a message identifier;
a module configured to determine if said message identifier uniquely maps to a corresponding classification category;
a module configured to label the message with the identified classification category if said message identifier maps directly to a corresponding classification category;
a module configured to parse the message to be classified and identify a plurality of features from the parsed message if said message identifier does not map directly to a corresponding classification category;
a module configured to compare at least one classification rule to the plurality of features if said message identifier does not map directly to a corresponding classification category;
a module configured to rate each classification rule that matches to the plurality of features;
a module configured to identify a classification category from said rating; and
a module configured to label the message with the identified classification category.

6. The system of claim 5, further comprising:
a module configured to compare a second classification rule to the plurality of features.

7. A method of classifying a message, the method comprising:
receiving a message to be classified on a server, said message having a message identifier;
determining if said message identifier uniquely maps to a corresponding classification category;
labeling the message with the identified classification category if said message identifier maps directly to a corresponding classification category;
parsing the message to be classified and identifying a plurality of features from the parsed message if said message identifier does not map directly to a corresponding classification category;
comparing at least one classification rule to the plurality of features if said message identifier does not map directly to a corresponding classification category;
rating each classification rule that matches to said plurality of features;
identifying a classification category from said rating; and
labeling the message with the identified classification category.

8. The method of claim 7, further comprising:
comparing a second classification rule to the plurality of features.

9. The method of claim 7, further comprising:
receiving a plurality of messages on one or more servers;
parsing the plurality of messages;
identifying features from the plurality of messages;
selecting a common classification category semantic;
matching at least some of the identified features with the common classification category semantic; and
generating a classification rule from the identified features matched with the common classification category semantic.

10. The method of claim 7, further comprising:
receiving a plurality of messages on one or more servers;
parsing the plurality of messages;
identifying features from the plurality of messages;
selecting a plurality of common classification category semantics;
matching at least some of the identified features with the respective plurality of common classification category semantics;
identifying messages corresponding to the at least some of the identified features; and
generating a classification category to message map.

11. The method of claim 10, further comprising:
selecting a plurality common classification category semantics;
identifying at least some of the plurality of messages having features matching the plurality of common classification category semantics;
dividing the identifying at least some of the plurality of messages into respective clusters of messages each having a unique common classification category semantic;
reviewing features from messages in the respective clusters; and
revising the classification rule.

* * * * *